(12) United States Patent
Miyazaki et al.

(10) Patent No.: US 9,731,491 B2
(45) Date of Patent: Aug. 15, 2017

(54) MELAMINE DECORATIVE BOARD

(71) Applicant: Aica Kogyo Co., Ltd., Kiyosu-shi (JP)

(72) Inventors: Nobumitsu Miyazaki, Ama (JP); Tomoya Ogino, Ama (JP); Koushi Suzuki, Ama (JP); Koutarou Kodera, Ama (JP)

(73) Assignee: AICA KOGYO CO., LTD. (JP)

( * ) Notice: Subject to any disclaimer, the term of this patent is extended or adjusted under 35 U.S.C. 154(b) by 0 days.

(21) Appl. No.: 14/574,795

(22) Filed: Dec. 18, 2014

(65) Prior Publication Data

US 2015/0101749 A1 Apr. 16, 2015

Related U.S. Application Data

(63) Continuation of application No. 13/635,246, filed as application No. PCT/JP2011/052979 on Feb. 14, 2011, now abandoned.

(30) Foreign Application Priority Data

Mar. 23, 2010 (JP) .................................. 2010-065697

(51) Int. Cl.
*B32B 37/00* (2006.01)
*B32B 38/08* (2006.01)
*B32B 37/24* (2006.01)

(52) U.S. Cl.
CPC ........ *B32B 38/08* (2013.01); *B32B 2037/243* (2013.01); *B32B 2309/105* (2013.01); *B32B 2317/125* (2013.01); *B32B 2607/00* (2013.01)

(58) Field of Classification Search
CPC ... B32B 38/08; B32B 2317/125; B32B 21/06; B32B 27/04

(Continued)

(56) References Cited

U.S. PATENT DOCUMENTS 4,405,690 A 9/1983 Brooker et al.
2002/0124774 A1* 9/2002 Volpatti .................. B32B 29/00
106/144.1

FOREIGN PATENT DOCUMENTS

AU 2011230894 9/2011
CN 1039861 9/1990
(Continued)

OTHER PUBLICATIONS

Machine translation of JP 2008-073979 date unknown.*
(Continued)

*Primary Examiner* — John Goff
(74) *Attorney, Agent, or Firm* — Grossman Tucker Perreault & Pfleger PLLC

(57) ABSTRACT

Provided is a melamine decorative board having a milky-white core layer and less warpage. When the melamine decorative board is bonded onto a base plate such as a plywood, a particle board, and a steel board, a color tone of the base plate does not appear through to a decorative layer. Stacked and thermal-pressure-formed are: a resin-impregnated patterned paper as the decorative layer; multiple sheets of a resin-impregnated core paper, as the core layer, produced by impregnating a whitish fibrous base material with a resin liquid including: a condensate of melamine and formaldehyde, and a divalent polyalkylene glycol or a derivative thereof, or a tri- or more valent polyalkylene glycol polyvalent ether, and drying the whitish fibrous base material; and a resin-impregnated backside paper, as a backside layer, produced by impregnating a fibrous base material with a condensate of melamine and formaldehyde and drying the fibrous base material.

7 Claims, 1 Drawing Sheet

(58) Field of Classification Search
USPC .......................................... 156/307.1–307.7
See application file for complete search history.

(56) References Cited

FOREIGN PATENT DOCUMENTS

| EP | 2551111 | | 11/2014 |
|----|---------|---|---------|
| JP | 5193083 | | 8/1993 |
| JP | 09136386 A | * | 5/1997 |
| JP | 9262955 | | 10/1997 |
| JP | 10095091 | | 4/1998 |
| JP | 2001001480 | | 1/2001 |
| JP | 2002212389 | | 7/2002 |
| JP | 2006240187 | | 9/2006 |
| JP | 2006247935 | | 9/2006 |
| JP | 2007245557 A | * | 9/2007 |
| JP | 2008056866 | | 3/2008 |
| JP | 2008073979 | | 4/2008 |
| JP | 4979038 | | 7/2012 |

OTHER PUBLICATIONS

Machine translation of JP 2006-240187 date unknown.*
Machine translation of JP 2001-001480 date unknown.*
Machine translation of JP 09-262955 date unknown.*
Machine translation of JP 09-136386 date unknown.*
Machine translation of JP 05-193083 date unknown.*
Machine translation of JP 2007-245557 date unknown.*
International Search Report dated May 24, 2011 issued in PCT Patent Application No. PCT/JP2011/052979, 2 pages.
International Preliminary Report on Patentability dated Nov. 1, 2012 issued in PCT Patent Application No. PCT/JP2011/052979, 8 pages.
Extended Search Report dated Sep. 3, 2013, issued in corresponding European Patent Application No. 11759092.7, 7 pages.
Chinese Office Action dated Mar. 17, 2014, issued in Chinese Patent Application No. 201180015651.2, partial English Translation provided, 9 pages.
Australian Examination Report dated Apr. 4, 2014, issued in Australian Patent Application No. 2011230894, 3 pages.
Taiwanese Examination Report dated Nov. 21, 2014, issued in Taiwanese Patent Application No. 100104731, partila English Translation provided, 10 pages.
Taiwanese Office Action Decision dated Mar. 23, 2015, issued in corresponding Taiwanese Patent Application No. 100104731, 8 pages. Relevant English language translation provided.
Indonesian Office Action dated Mar. 24, 2016, issued in corresponding Indonesian Patent Application No. W-00201204296, 3 pages. Partial English language translation provided.
Korean Office Action dated Sep. 23, 2016, issued in corresponding Korean Patent Application No. 10-2012-7026650, 11 pages. English language translation provided.

* cited by examiner

MELAMINE DECORATIVE BOARD

CROSS REFERENCE TO RELATED APPLICATIONS

This application is a continuation of U.S. patent application Ser. No. 13/635,246 filed Sep. 14, 2012, now abandoned, which is a 371 of International Patent Application No. PCT/JP2011/052979 filed Feb. 14, 2011 which claims priority to Japanese Patent Application No. 2010-065697 filed Mar. 23, 2010, the entire content of each of which are incorporated herein by reference.

TECHNICAL FIELD

The present invention relates to a melamine decorative board.

BACKGROUND ART

Conventionally, it is generally known that a melamine decorative board is produced with a melamine resin-impregnated paper as a decorative layer, a phenol resin-impregnated paper as a core layer, and a backside paper as needed. However, dark brown color of phenol in the core layer is noticeable when such a melamine decorative board is bonded onto a top board for a table, a counter, a desk, or the like. In order to solve this problem, it has been known in recent years to use a resin-impregnated paper, which is produced by impregnating melamine resin into a whitish fibrous base material with less ash content, as a core layer.

PRIOR ART DOCUMENTS

Patent Documents

Patent Document 1: Japanese Unexamined Patent Application Publication No. 2008-073979
Patent Document 2: Japanese Unexamined Patent Application Publication No. 2002-212389
Patent Document 3: Japanese Unexamined Patent Application Publication No. 2001-001480

SUMMARY OF THE INVENTION

Problems to be Solved by the Invention

Since the whitish fibrous base material with less ash content is used for the core layer, when a decorative board, in which a decorative paper colored softly and lightly with white, yellow, or the like is used for a decorative layer, is bonded onto a core member such as a plywood, a particle board, a steel board, color tone of the core member is seen through and faintly appears on a surface of the decorative board, thereby to affect the original color tone of the decorative layer in some cases. Moreover, while a thickness of the decorative board is adjusted to be between 0.6 mm and 1.8 mm as appropriate by changing the number of sheets of a resin-impregnated core paper used as the core layer, a balance of cure shrinkage between the core layer and the decorative layer becomes easily deteriorated when the number of the sheets is smaller. As a result, there arises a problem in which the decorative layer is warped into a concave shape under the influence of temperature and humidity.

Means for Solving the Problems

The present invention has been contemplated to solve the above-described problems. A main constituent of the present invention is a melamine decorative board produced by stacking a decorative layer, a core layer, and a backside layer, and then forming the layers under heat and pressure.

The decorative layer is a resin-impregnated patterned paper.

The core layer is a plurality of sheets of a resin-impregnated core paper produced by impregnating a whitish fibrous base material with a resin liquid including: a condensate of melamine and formaldehyde; and a divalent polyalkylene glycol or a derivative thereof, or a tri- or more valent polyalkylene glycol polyvalent ether, and then drying the whitish fibrous base material.

The backside layer is a resin-impregnated backside paper produced by impregnating a fibrous base material with a condensate of melamine and formaldehyde, and then drying the fibrous base material.

Effects of the Invention

In the melamine resin decorative board of the present invention, since the whitish fibrous base material is used as a base material, the core layer is milky-white. Therefore, it never happens that dark brown color specific to phenol resin appears at the cut end surface to cause a sense of incongruity.

Moreover, since the resin-impregnated backside paper with a high concealing property is used as a backside layer, a concealing property is improved to avoid appearance of a ground color of a core member such as a plywood and a particle board. As a result, the melamine decorative board looks attractive in terms of design.

Furthermore, a warpage can be suppressed by setting a dimensional stability, which is measured in accordance with JIS K 6902, of the decorative layer after formed under heat and pressure to be greater than or equivalent to a dimensional stability of the backside layer.

MODE FOR CARRYING OUT THE INVENTION

Figure 1:
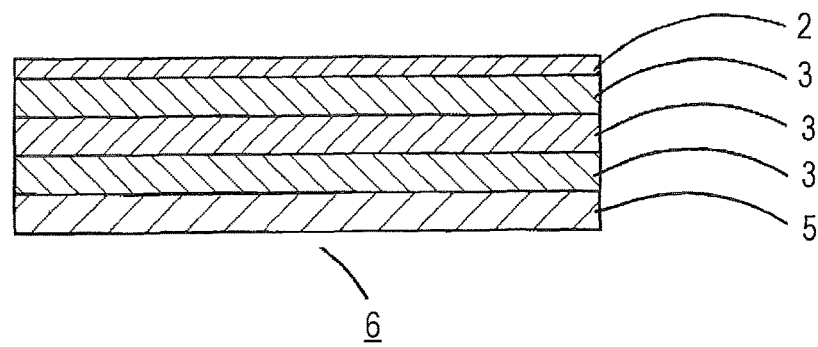
FIG. 1 is a structural sectional view of a melamine decorative board of the present invention.

The present invention is described in detail hereinafter. A condensate of melamine and formaldehyde, i.e., a reactive resin, can be obtained by: heating a mixture having a molar ratio of formaldehyde to melamine of 1.0 or more to a temperature of 80-100° C. under weak alkaline conditions to allow a methylolation reaction to proceed; condensing the mixture to reach a predetermined reaction level; and then neutralizing and cooling the mixture. Although melamine can be used independently, co-condensation with ace toguanamine, benzoguanamine, cyclohexaneguanamine, ureas or the like is possible. Furthermore, a modified resin using p-toluene sulfonamide, caprolactam and the like can be also utilized.

As a denaturant, 9-20 parts by weight of divalent polyalkylene glycol having a molecular weight of 2000 or less or a derivative thereof per 100 parts by weight of a solid content of the condensate is blended to the condensate to provide a resin liquid for impregnation. In a case of tri- or more valent polyalkylene glycol polyvalent ether having a molecular weight of 2000 or less, 13-30 parts by weight thereof per 100 parts by weight of a solid content of the condensate is blended to the condensate as a denaturant to provide a resin liquid for impregnation. The denaturant is dissolved into methyl alcohol; phase-separated from the melamine-formaldehyde condensate, which becomes a matrix by drying after impregnation and heating during forming; and micro-dispersed uniformly. This contributes to translucency of the core layer of the obtained melamine resin decorative board, and improvement in dimensional stability, crack resistance, flexibility, and the like of the melamine resin decorative board.

As for a state of the resin liquid provided for impregnation, it is necessary that while the condensate of melamine and formaldehyde, and the denaturant are dissolved into the resin liquid, the denaturant is separated and dispersed when the resin liquid is thermally cured. If the denaturant is in a uniformly dissolved state when the resin liquid is thermally cured, a melamine decorative board excellent in dimensional stability and crack resistance cannot be obtained. In the present invention, in order to confirm that the denaturant is separated and dispersed in the resin when the resin liquid is thermally cured, it is determined whether the resin is uniformly transparent; whether the resin is turbid in milky-white; or whether the denaturant is separated and exudes, when the resin liquid is cured. If the resin is in a uniformly transparent state, it is determined that the denaturant is neither separated from nor dispersed in the resin but the resin and the denaturant are dissolved in each other. If the resin is in a turbid milky-white state, it is determined that the denaturant is separated and dispersed, and a melamine decorative board excellent in dimensional stability and crack resistance can be obtained. If the denaturant exudes from the cured matter, it is determined that the denaturant is not dispersed but separated, and the above effects cannot be expected.

In a case where a blending ratio of the denaturant is less than a lower limit (by parts by weight), a state in which the denaturant is sufficiently separated and dispersed in the resin cannot be obtained. As a result, dimensional stability and crack resistance are not improved as intended, and spotty unevenness appears when only a core layer is formed, thereby to affect a color tone of a decorative layer. In contrast, in a case where a blending ratio of the denaturant exceeds an upper limit (by parts by weight), properties such as heat resistance are deteriorated. Furthermore, when a melamine decorative board is obtained, exudation of the denaturant is induced during forming under heat and pressure and problems arise, for example, that a pressing board (forming plate) is stained, which is not preferable.

Listed as specific examples of a divalent polyalkylene glycol or a derivative thereof are polyethylene glycol, polypropylene glycol, polybutylene glycol, poly(oxyethylene-oxypropylene)glycol, poly(oxyethylene-oxytetramethylene)glycol, poly(oxypropylene-oxytetramethylene)glycol. Listed as specific examples of a tri- or more valent polyalkylene glycol polyvalent ether are polyethylene glycol glyceryl ether, polypropylene glycol glyceryl ether, polybutylene glycol glyceryl ether, poly(ethylene glycol-propylene glycol)glyceryl ether, poly(propylene glycol-tetramethylene glycol)glyceryl ether as a triad; and polyethylene glycol pentaerythritol ether, polypropylene glycol pentaerythritol ether, polybutylene glycol pentaerythritol ether, poly(ethylene glycol-propylene glycol)pentaerythritol ether as a tetrad.

A resin-impregnated core paper as a core layer is obtained by impregnating a whitish fibrous base material with a varnish prepared by adding a divalent polyalkylene glycol or a derivative thereof, or a tri- or more valent polyalkylene glycol polyvalent ether to the condensate; and then drying the whitish fibrous base material. As a whitish fibrous base material used, various base materials can be applied, such as bleached kraft pulp paper, as well as paper including white fibers such as glass fibers, vinylon fibers, and the like, which become transparent or translucent when showing a wet color, blended paper, non-woven fabric, woven fabric, and the like. A basis weight may be around 100-200 g/m$^2$.

It is preferable that the whitish fibrous base material has 10% by weight or less of ash content in order to ensure a milky-white core layer and to obtain crack resistance and flexibility. If the ash content exceeds an upper limit, the core layer does not become milky-white, and the intended improvement in dimensional stability, crack resistance, flexibility, and the like in the decorative board cannot be obtained, which is not preferable. Moreover, it is preferable to adjust a total light transmittance in accordance with JIS K 7136 of an article formed only of resin-impregnated core paper to 30% or less. If the total light transmittance exceeds an upper limit, the color tone of the core layer when bonded cannot be obtained, which is not preferable.

For resin-impregnated backside paper as a backside layer, base paper for a decorative board having a concealing property, which is prepared by impregnating bleached kraft paper with a varnish and then drying the bleached kraft paper, for example, can be applied. It is preferable that the varnish does not include the above-described divalent polyalkylene glycol or the derivative thereof, or the tri- or more valent polyalkylene glycol polyvalent ether so as to suppress a warpage of the melamine decorative board. This is because in a core layer including a divalent polyalkylene glycol or a derivative thereof, or a tri- or more valent polyalkylene glycol polyvalent ether, the resin is slow in curing speed and low in curing density; and in contrast, in a backside layer not including a divalent polyalkylene glycol or a derivative thereof, or a tri- or more valent polyalkylene glycol polyvalent ether, the resin is fast in curing speed and high in curing density.

The bleached kraft paper is produced from raw material for pulp by a Fourdrinier multi-cylinder paper machine, a Fourdrinier Yankee paper machine, or a cylinder paper machine. It is preferable that the bleached kraft paper is adjusted with titanium oxide or the like to have 3-10% by weight of ash content so that a color tone of a base plate, such as a plywood, a particle board, and a steel board, is not seen through. If the ash content is less than a lower limit, concealing property is lowered to allow the color tone of the base plate to easily appear, and if the ash content exceeds an upper limit, crack resistance of the melamine decorative board is made more likely to be deteriorated.

As a specification of the backside paper, it is preferable to adjust a total light transmittance in accordance with JIS K 7136 of an item formed only of resin-impregnated backside paper to 30% or less in order to ensure concealing property. If the total light transmittance exceeds an upper limit, concealing property is lowered and the color tone of the core layer when bonded cannot be obtained, which is not preferable. A basis weight may be 120-200 g/m$^2$.

A further object of the present invention is to provide a melamine decorative board with less warpage. To achieve this, it is preferable that a dimensional stability in accordance with JIS K 6902 of the decorative layer after formed under heat and pressure is greater than or equivalent to a dimensional stability of the backside layer.

Especially, it is preferable that a ratio of the dimensional stability of the decorative layer to that of the backside layer is adjusted to 1:0.3 or more to 1.0 or less, more preferably 0.4 or more to 0.7 or less, to keep a balance. Furthermore, it is preferable that a dimensional stability in accordance with JIS K 6902 of only a core layer after formed under heat and pressure is 0.5% or less because this provides the melamine decorative board with excellent crack resistance.

While the above conditions are met, if the dimensional stability in accordance with JIS K 6902 of only the core layer after formed under heat and pressure is 0.1% or more to 0.3% or less in a longitudinal direction and 0.3% or more to 0.5% or less in a lateral direction and if the dimensional stability in accordance with JIS K 6902 of only the backside layer after formed under heat and pressure is 0.2% or more to 0.4% or less in a longitudinal direction and 0.5% or more to 1.0% or less in a lateral direction, then good warpage and crack resistance is obtained.

By keeping a balance of cure shrinkage between the backside layer and the decorative layer to minimize a warpage, the melamine decorative board becomes easy to handle during processing and free from a breakage, a crack, and the like. If the backside layer is not used, the core layer with low curing density cannot bear shrinkage of the decorative layer, and becomes easily warped, making a decorative surface concave.

The melamine resin decorative board of the present invention is obtained by stacking the resin-impregnated backside paper, the plurality of sheets of resin-impregnated core paper, the resin-impregnated patterned paper, and, as appropriate, the resin-impregnated surface paper on the surface in this order, and pressing the stacked sheets of paper under thermal pressure condition of a temperature of 120-160° C., a pressure of 40-70 kg/cm², and a time period of 30-70 minutes.

Embodiment 1

8.7 mol of melamine, 1.8 mol of acetoguanamine, 13.6 mol of formaldehyde (converted value) in a 37% formalin solution, and water were fed into a flask equipped with a stirring device, a thermometer, and a cooling condenser, and a reaction solution was adjusted to pH 9.4 with caustic soda. Then, after reacted at 95° C. for an hour, the reaction solution was adjusted to pH 9.2 and concentrated. Furthermore, p-toluenesulfonic acid amide is added to the reaction solution and, after the reaction solution was adjusted to pH 7.2 and aged, the reaction solution was adjusted to pH 9.2 with caustic soda, to obtain a modified melamine-acetoguanamine co-condensate resin.

Next, the following are blended per 100 parts by weight of a solid content of the modified melamine-acetoguanamine co-condensate resin: 20 parts by weight of a solid content of polypropylene glycol glyceryl ether having an average molecular weight of 350 and a hydroxyl value of 440-480 as a tri- or more valent polyalkylene glycol polyvalent ether; 7.5 parts by weight of urea; 100 parts by weight of methanol; 2 parts by weight of p-toluenesulfonic acid as a curing agent. As a result, a colorless and transparent varnish was obtained.

Subsequently, the varnish was impregnated into a bleached kraft paper having an ash content of 0% by weight and a basis weight of 180 g/m² so that a degree of impregnation of resin as indicated by Formula 1 becomes 57% and a volatile matter content becomes 7%. Then, the bleached kraft paper was dried to obtain a resin-impregnated core paper.

$$\text{Degree of impregnation}(\%) = \frac{\text{Weight after impregnation} - \text{Weight before impregnation}}{\text{Weight before impregnation}} \times 100 \quad \text{[Formula 1]}$$

A patterned paper for a decorative board having a basis weight of 140 g/m² was impregnated with a varnish mainly composed of melamine resin so that a degree of impregnation of resin as indicated by Formula 1 becomes 80%. Then, the patterned paper was dried to obtain a resin-impregnated patterned paper as a decorative layer.

A kraft paper, which had been produced from a pulp slurry obtained by beating hardwood bleached kraft pulp and a softwood bleached kraft pulp, having an ash content of 8% by weight and a basis weight of 185 g/m² was impregnated with a varnish mainly composed of the modified melamine-acetoguanamine co-condensate resin so that a degree of impregnation of resin as indicated by Formula 1 becomes 57%. Then, the kraft paper was dried to obtain a resin-impregnated backside paper.

One sheet of the resin-impregnated backside paper, three sheets of the resin-impregnated core paper, and one sheet of the resin-impregnated patterned paper are stacked in this order from bottom, and the stacked sheets were formed under thermal pressure condition of a temperature of 128° C., a pressure of 70 kg/cm², and a time period of 120 minutes, to obtain a melamine decorative board having a thickness of 1.0 mm.

Embodiment 2

Embodiment 2 was implemented in a manner similar to that described in Embodiment 1, except that a kraft paper having an ash content of 2% by weight and a basis weight of 160 g/m² was used instead of the kraft paper having an ash content of 8% by weight and a basis weight of 185 g/m².

Embodiment 3

Embodiment 3 was implemented in a manner similar to that described in Embodiment 1, except that a kraft paper having an ash content of 10% by weight and a basis weight of 190 g/m² was used instead of the kraft paper having an ash content of 8% by weight and a basis weight of 185 g/m².

Embodiment 4

Embodiment 4 was implemented in a manner similar to that described in Embodiment 1, except that an amount of polypropylene glycol glyceryl ether blended was 13 parts by weight in terms of solid content.

Embodiment 5

Embodiment 5 was implemented in a manner similar to that described in Embodiment 1, except that an amount of polypropylene glycol glyceryl ether blended was 30 parts by weight in terms of solid content.

Embodiment 6

Embodiment 6 was implemented in a manner similar to that described in Embodiment 1, except that poly(ethylene glycol-propylene glycol)glyceryl ether was blended instead of polypropylene glycol glyceryl ether.

Embodiment 7

Embodiment 7 was implemented in a manner similar to that described in Embodiment 1, except that 15 parts by weight of a solid content of poly(oxyethylene-oxypropylene)glycol having an average molecular weight of 1400 and a hydroxyl value of 70-86 was blended as a divalent polyalkylene glycol or a derivative thereof instead of polypropylene glycol glyceryl ether.

Embodiment 8

Embodiment 8 was implemented in a manner similar to that described in Embodiment 7, except that an amount of poly(oxyethylene-oxypropylene)glycol blended was 9 parts by weight in terms of solid content.

Embodiment 9

Embodiment 9 was implemented in a manner similar to that described in Embodiment 7, except that an amount of poly(oxyethylene-oxypropylene)glycol blended was 20 parts by weight in terms of solid content.

Comparative Example 1

Comparative Example 1 was implemented in a manner similar to that described in Embodiment 1, except that four sheets of the resin-impregnated core paper and one sheet of the resin-impregnated patterned paper were used instead of using the resin-impregnated backside paper. The dimensional stability of the backside layer shown in Table 1 is represented by a value measured in a test carried out for one sheet of the resin-impregnated core paper arranged undermost after formed under heat and pressure.

Comparative Example 2

Comparative Example 2 was implemented in a manner similar to that described in Comparative Example 1, except that a resin-impregnated paper impregnated with a resin liquid (for resin-impregnated core paper) having no polypropylene glycol glyceryl ether blended therein was used. The dimensional stability of the backside layer shown in Table 1 is represented by a value measured in a test carried out for one sheet of resin-impregnated paper arranged undermost after formed under heat and pressure.

Reference Example 1

Reference Example 1 was implemented in a manner similar to that described in Embodiment 1, except that a bleached kraft paper having an ash content of 0% by weight and a basis weight of 180 g/m$^2$ was used instead of the kraft paper having an ash content of 8% by weight and a basis weight of 185 g/m$^2$.

Reference Example 2

Reference Example 2 was implemented in a manner similar to that described in Embodiment 1, except that a kraft paper having an ash content of 50% by weight and a basis weight of 140 g/m$^2$ was used instead of the kraft paper having an ash content of 8% by weight and a basis weight of 185 g/m$^2$.

Reference Example 3

Reference Example 3 was implemented in a manner similar to that described in Embodiment 1, except that an amount of polypropylene glycol glyceryl ether blended was 5 parts by weight.

Reference Example 4

Reference Example 4 was implemented in a manner similar to that described in Embodiment 1, except that an amount of polypropylene glycol glyceryl ether blended was 40 parts by weight.

Evaluation results are shown in Table 1.

TABLE 1

| | Decorative layer (one layer) | | Nature of core layer & properties of core layer after formed under heat and pressure (three layers) | | | | | | Nature of backing layer & properties after formed under heat and pressure (one layer) | | | | | Form- ability of decor- ative board | Color of cut end surface of decor- ative board | Properties of decorative board | | |
|---|---|---|---|---|---|---|---|---|---|---|---|---|---|---|---|---|---|---|
| | Dimensional stability | | Additive Agent | | External appearance | Total light transmit- tance | Dimensional stability | | Amount of Ti contained in base paper | External appear- ance | Total light transmit- tance | Dimensional stability | | | | Conceal- ing property (ΔE) | Warpage | Crack regis- tance test |
| | Longitu- dinal direction | Lateral direction | Kind | amount (parts by weight) | | | Longitu- dinal direction | Lateral direction | | | | Longitu- dinal direction | Lateral direc- tion | | | | | |
| Embodi- ment 1 | 0.96% | 1.25% | polypropylene glycol glyceryl ether | 20 | uniformly milky- white | 18.4% | 0.23% | 0.40% | 8% | uniformly white | 23.8% | 0.33% | 0.69% | ○ | milky- white | ○ | ○ | ○ |
| Embodi- ment 2 | 0.96% | 1.25% | polypropylene glycol | 20 | uniformly milky- white | 22.5% | 0.23% | 0.40% | 2% | uniformly white | 47.9% | 0.34% | 0.64% | ○ | milky- white | ○ | ○ | ○ |
| Embodi- ment 3 | 0.96% | 1.25% | polypropylene glycol glyceryl ether | 20 | uniformly milky- white | 22.5% | 0.23% | 0.40% | 10% | uniformly white | 19.8% | 0.33% | 0.61% | ○ | milky- white | ○ | ○ | ○ |
| Embodi- ment 4 | 0.96% | 1.25% | polypropylene glycol glyceryl ether | 13 | uniformly milky- white | 25.6% | 0.27% | 0.41% | 8% | uniformly white | 23.8% | 0.33% | 0.69% | ○ | milky- white | ○ | △ | △ |
| Embodi- ment 5 | 0.96% | 1.25% | polypropylene glycol glyceryl ether | 30 | uniformly milky- white | 16.9% | 0.24% | 0.43% | 8% | uniformly white | 23.8% | 0.33% | 0.69% | ○ | milky- white | ○ | ○ | ◎ |
| Embodi- ment 6 | 0.96% | 1.25% | poly(ethylene glycol-propylene glycol)glyceryl ether | 20 | uniformly milky- white | 22.5% | 0.30% | 0.46% | 8% | uniformly white | 23.8% | 0.33% | 0.69% | ○ | milky- white | ○ | ○ | ○ |
| Embodi- ment 7 | 0.96% | 1.25% | poly(oxyethylene- oxypropyl- ene)glycol | 15 | uniformly milky- white | 21.2% | 0.20% | 0.38% | 8% | uniformly white | 23.8% | 0.33% | 0.69% | ○ | milky- white | ○ | ○ | ○ |
| Embodi- ment 8 | 0.96% | 1.25% | poly(oxyethylene- oxypropyl- ene)glycol | 9 | uniformly milky- white | 23.9% | 0.27% | 0.42% | 8% | uniformly white | 23.8% | 0.33% | 0.69% | ○ | milky- white | ○ | △ | △ |
| Embodi- ment 9 | 0.96% | 1.25% | poly(oxyethylene- oxypropyl- ene)glycol | 20 | uniformly milky- white | 21.0% | 0.24% | 0.40% | 8% | uniformly white | 23.8% | 0.33% | 0.69% | ○ | milky- white | ○ | ○ | ○ |
| Compar- ative Example 1 | 0.96% | 1.25% | polypropylene glycol | 20 | uniformly milky- white | 18.4% | 0.23% | 0.40% | 0% | uniformly milky- white | 32.6% | 0.21% | 0.40% | ○ | milky- white | △ | × | ○ |
| Compar- ative Example 2 | 0.96% | 1.25% | — | — | clear yellow & spotty | 47.3% | 0.29% | 0.49% | 0% | clear yellow & spotty | 49.6% | 0.34% | 0.59% | ○ | trans- parent | × | ○ | × |
| Reference Example 1 | 0.96% | 1.25% | polypropylene glycol glyceryl ether | 20 | uniformly milky- white | 22.5% | 0.23% | 0.40% | 0% | clear yellow & spotty | 49.6% | 0.34% | 0.59% | ○ | milky- white | × | ○ | ◎ |
| Reference Example 2 | 0.96% | 1.25% | polypropylene glycol glyceryl ether | 20 | uniformly milky- white | 22.5% | 0.23% | 0.40% | 50% | uniformly white | 8.0% | 0.96% | 1.25% | ○ | milky- white | ◎ | ○ | × |

TABLE 1-continued

| | Decorative layer (one layer) Dimensional stability | | Nature of core layer & properties of core layer after formed under heat and pressure (three layers) | | | | | | Nature of backing layer & properties after formed under heat and pressure (one layer) | | | | | Properties of decorative board | | | |
|---|---|---|---|---|---|---|---|---|---|---|---|---|---|---|---|---|---|
| | | | Additive Agent | | | | Dimensional stability | | | | | Dimensional stability | | | | | |
| | Longitudinal direction | Lateral direction | Kind | amount (parts by weight) | External appearance | Total light transmittance | Longitudinal direction | Lateral direction | Amount of Ti contained in base paper | External appearance | Total light transmittance | Longitudinal direction | Lateral direction | Formability of decorative board | Color of cut end surface of decorative board | Concealing property (ΔE) | Warpage | Crack resistance test |
| Reference Example 3 | 0.96% | 1.25% | polypropylene glycol glyceryl ether | 5 | clear yellow & spotty | 39.3% | 0.27% | 0.42% | 8% | uniformly white | 23.8% | 0.33% | 0.69% | ○ | transparent | ○ | △ | X |
| Reference Example 4 | 0.96% | 1.25% | polypropylene glycol glyceryl ether | 40 | uniformly milky-white | 20.0% | 0.30% | 0.44% | 8% | uniformly white | 23.8% | 0.33% | 0.69% | X (bleed-out) | milky-white | ○ | △ | ○ |

Evaluation methods are as follows.

Formability: A melamine decorative board was obtained by forming under thermal pressure condition of a temperature of 132° C., a pressure of 70 kg/cm², and a time period of 64 minutes. A melamine decorative board obtained in a good condition was evaluated as ○ (good), and a melamine decorative board in which a bleedout (exudation) of the denaturant from a back face or a side face was observed was evaluated as X (poor).

External appearance of the core layer and the backside layer: Three stacked sheets of the resin-impregnated core paper or just one sheet of the backside layer were formed under heat and pressure in a manner similar to that for obtaining a melamine decorative board, and then each external appearance was observed.

Concealing property: Using a color tone (L*a*b*ΔE) measured based on a light resistance test in accordance with "Testing method for laminated thermosetting high-pressure decorative sheets" as set forth in JIS K 6902 (1998), a color tone of one sheet of the backside layer formed under heat and pressure was measured on a white base material and a plywood base material to determine a difference in color tone (ΔE).

When the value of ΔE was 2.0 or less, concealing property was evaluated as ⊚ (very good), 2.0-5.0 as ○ (good), 5.0-10.0 as Δ (average), and 10.0 or more as X (poor).

Total light transmittance: Total light transmittance was measured based on the specification of JIS K 7361-1 (2000) 3.2. As a measuring device, Haze-Gard II manufactured by Toyo Seiki Seisaku-Sho, Ltd. was used.

Figure 2:
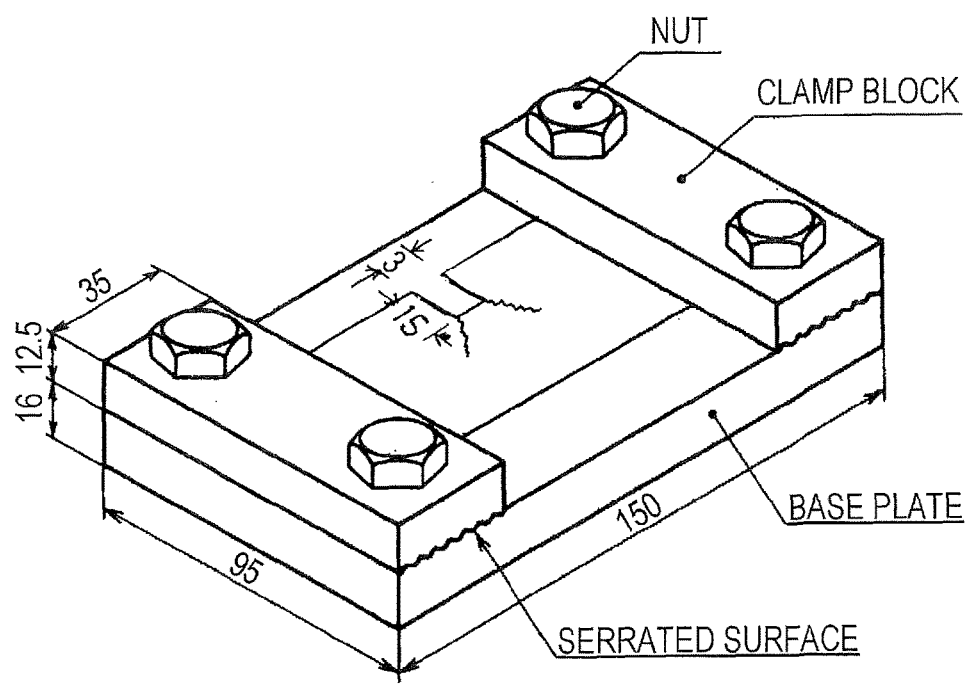
FIG. 2 is a perspective view showing a crack resistance test.

Crack resistance: On the decorative board with a dimension of 150 mm by 50 mm (width direction×fiber direction), a slit of 3 mm in width by 15 mm in depth was made parallel to the fiber direction, to obtain a test specimen. After cured in a thermostatic oven at 40° C. and 90% RH for 15 hours, the test specimen was immediately fixed to an apparatus (see FIG. 2) used for a crack resistance test under pressure as set forth in JIS K-6902. Then, after the test specimen was allowed to stand in a thermostatic oven at 80° C. for a predetermined time period, a crack length was measured.

When the crack length after a lapse of nine hours was 0-10 mm, the crack resistance was evaluated as ⊚ (very good), 10-20 mm as ○ (good), 20-30 mm as Δ (average), and 30 mm or longer as X (poor). In addition, when the crack penetrated before a lapse of nine hours (i.e., when the crack length reached about 35 mm), the crack resistance was also evaluated as X (poor).

Warpage: A piece was cut out of the decorative board with a dimension of 280 mm by 50 mm (width direction×fiber direction), and an amount of warpage was measured at each of four edge points. When the maximum value of warpage of the decorative board was 0-5 mm, warpage resistance was evaluated as ○ (good), 5-10 mm as Δ (average), and 10 mm or more as X (poor).

Dimensional stability: Dimensional stability was measured based on the dimensional stability test in accordance with "Testing method for laminated thermosetting high-pressure decorative sheets" as set forth in JIS K 6902. The core layer was formed of three stacked sheets of the resin-impregnated core paper under a condition same as that of Embodiment 1, and the backing layer was formed of just one sheet of the backside layer under a condition same as that of Embodiment 1.

EXPLANATION OF REFERENCE NUMERALS

2 . . . resin-impregnated decorative paper layer,
3 . . . resin-impregnated core paper layer,
5 . . . resin-impregnated backside paper layer,
6 . . . melamine decorative board

What is claimed is:

1. A method for producing a melamine decorative board comprising:
   providing a decorative layer comprising a resin-impregnated patterned paper;
   impregnating a whitish fibrous base material with a resin liquid and to form a plurality of sheets of resin-impregnated core paper, said resin liquid comprising a condensate of melamine and formaldehyde; and a divalent polyalkylene glycol or a derivative thereof, or a tri- or more valent polyalkylene glycol polyvalent ether;
   drying the plurality of sheets of resin-impregnated core paper to form a core layer;
   impregnating a fibrous base material with a varnish comprising a condensate of melamine and formaldehyde, wherein an ash content of the fibrous base material is 8-10% by weight, to form an impregnated fibrous base material for a backside paper which backside paper is different from said resin-impregnated patterned paper, wherein said varnish does not include said divalent polyalkylene glycol or said derivative thereof, or said tri- or more valent polyalkylene glycol polyvalent ether;
   drying said impregnated fibrous base material for the backside paper to form a backside layer;
   stacking said decorative layer, said core layer, and said backside layer such that said core layer is disposed between said decorative layer and said backside layer; and
   applying heat and pressure to said stacked decorative layer, core layer, and backside layer to form said melamine decorative board;
   wherein said core layer exhibits, when measured independently, a dimensional stability in accordance with Japanese Industrial Standard (JIS) K 6902 after application of said heat and pressure of from 0.1% or more to 0.3% or less in a longitudinal direction and from 0.3% or more to 0.5% or less in a lateral direction, and
   wherein a total light transmittance in accordance with JIS K 7136 of an item formed only of the impregnated fibrous base material for the backside paper is 30% or less.

2. The method for producing a melamine decorative board according to claim 1, wherein said decorative layer has a dimensional stability in accordance with JIS K 6902 that is greater than or equivalent to that of said backside layer.

3. The method for producing a melamine decorative board according to claim 1, wherein a total light transmittance in accordance with JIS K 7136 of only said core layer after formed under heat and pressure is 30% or less.

4. The method for producing a melamine decorative board according to claim 1, wherein an amount of said divalent polyalkylene glycol or said derivative thereof added is 9-20 parts by weight per 100 parts by weight of a solid content of said condensate in said resin liquid.

5. The method for producing a melamine decorative board according to claim 1, wherein an amount of said tri- or more valent polyalkylene glycol polyvalent ether added is 13-30 parts by weight per 100 parts by weight of a solid content of the condensate in said resin liquid.

6. The method for producing a melamine decorative board according to claim 2, wherein a total light transmittance in accordance with JIS K 7136 of only said core layer after formed under heat and pressure is 30% or less.

7. The method for producing a melamine decorative board according to claim 1, wherein providing said decorative layer includes impregnating a patterned paper with a resin.

\* \* \* \* \*